No. 849,488. PATENTED APR. 9, 1907.
A. J. MORSE.
ROLLER BEARING.
APPLICATION FILED JAN. 24, 1906.

WITNESSES:
Frank O'Connor
Charles D. Green

INVENTOR
Archier J. Morse
BY
G. W. H. Benjamin
ATTORNEY

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

ROLLER-BEARING.

No. 849,488.     Specification of Letters Patent.     Patented April 9, 1907.

Application filed January 24, 1906. Serial No. 297,572.

*To all whom it may concern:*

Be it known that I, ARTHUR JACOB MORSE, a citizen of the United States, residing at Torrington, county of Litchfield, State of Connecticut, have invented certain new and useful Improvements in Roller - Bearings, of which the following is a specification.

My invention relates to roller-bearings, and as herein embodied is designed for use in mounting vehicle or other wheels, rotating elements, &c.

The object of the invention is primarily to produce a roller-bearing possessing advantages in point of tractive efficiency—that is to say, a balanced bearing self-acting in taking up end thrusts and in which the friction and resistance between the relatively moving parts is so evenly distributed as to be practically a negligible quantity.

A further object is to maintain absolute parallelism throughout the roller system—that is to say, an automatic adjustment or compensating action for wear upon the surfaces of the coöperating parts, and thus insure perfect rotative movement.

The invention is further designed to provide in the event of the rollers of the bearing becoming obstructed or locked for the free and continued rotation of the wheel or other element mounted thereon.

For convenience of illustration I have limited the showing in the accompanying drawings to the application of the invention as an axle-bearing; but it will be understood that its use is not in any wise restricted, as it may obviously be employed for other purposes, if desired.

Figure 1:
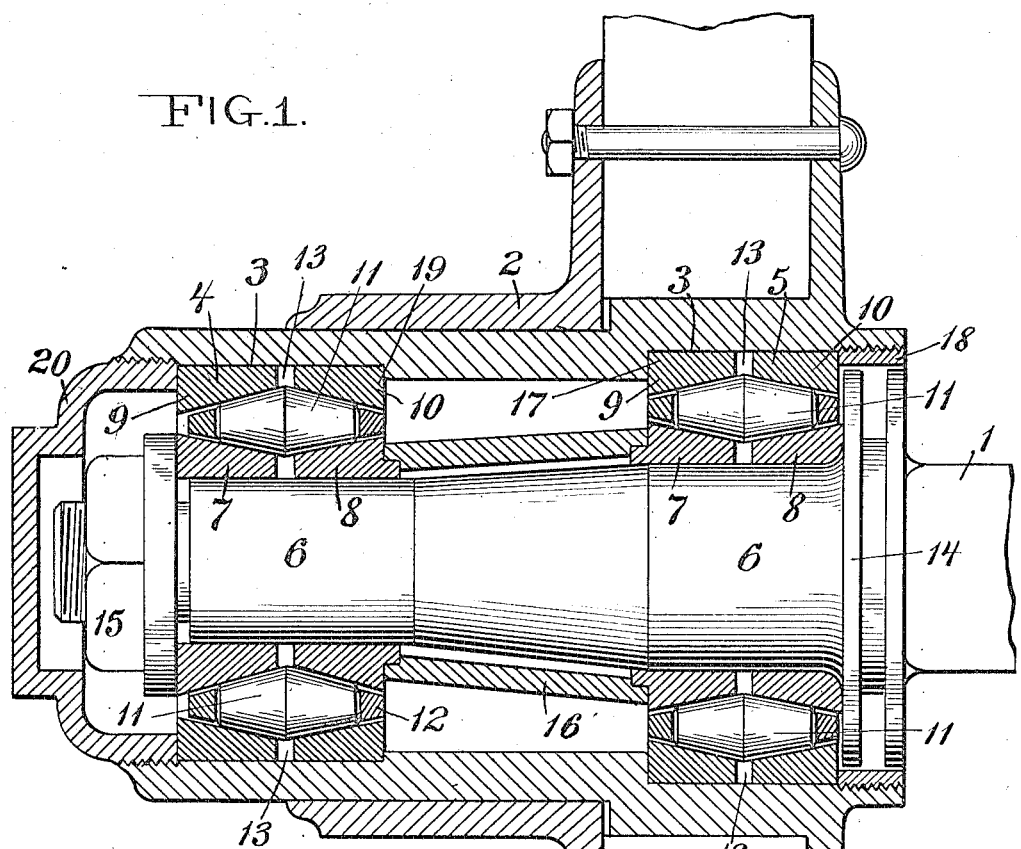
Figure 2:
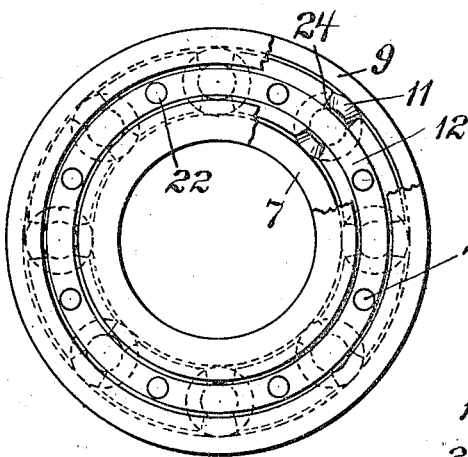
Figure 3:
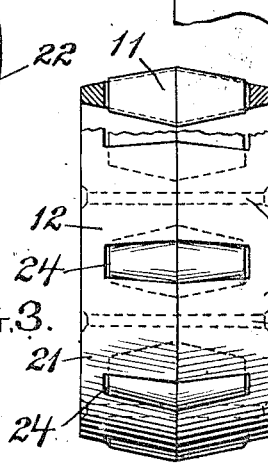
Figure 4:
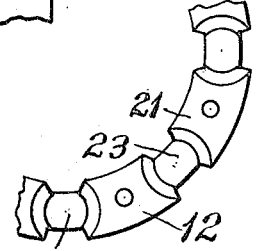

In the drawings, Figure 1 is a central sectional view taken lengthwise of the axle. Fig. 2 is a detail view of one of the bearings removed. Fig. 3 is a similar view of the sectional rack or case in which the rollers are mounted, and Fig. 4 is a detail view showing a portion of the rack from which the rollers have been removed.

Referring now to the drawings, 1 represents a portion of an axle, and 2 the sectional metallic hub of a wheel mounted thereon. The hub of the usual hollow form is counterbored, as indicated at 3, to receive two sets of bushings 4 and 5, which are interposed between the same and the bearing portions 6 of the axle.

Each set of bushings consists of four rings 7 8 9 10, which are combined in pairs by being arranged one within the other and as assembled form a race for a series of double-cone rollers 11, carried in a rack or case 12. The coöperating pairs of rings of each set of bushings are relatively spaced, as indicated at 13, to clear the central portion of the rollers and permit limited endwise movement or play thereof, such as would occur when, by reason of uneven wear, the rollers tend to turn faster at one end than the other. The rollers are thus rendered self-adjusting to compensate for wear and maintain themselves in parallel relation throughout the entire series.

The inner rings 7 and 8 of the bushings are fitted to turn freely upon the bearing portions 6 of the axle between the flange 14 and nut 15 thereof and are held against endwise movement by an interposed sleeve 16. The outer rings 9 and 10 are similarly fitted in the counterbored portions of the hub, those of the inner set of bushings 4 being held between an annular shoulder 17 and a screw-ring 18 and those of the outer set 5 between a similar shoulder 19 and the terminal screw-cap 20 of the hub. Thus mounted the wheel may turn with or independent of the bushings in the event of the rollers becoming locked or otherwise obstructed. Normally, however, or while there is entire freedom of movement throughout the roller system the friction and resistance opposing rotation of the bushings will be sufficient to effectually check movement thereof.

The racks 12, (shown in detail in Figs. 2, 3, 4,) in which the rollers are carried, are each formed of twin rings 21, which are secured together by pins, screws, or rivets 22. At equispaced points throughout the adjoining faces of the rings 21 a series of oppositely-disposed tapering sockets 23 are formed, which when the rings are united combine to form pockets or retaining-recesses in which the double-cone rolls 11 are loosely held. The diameter of the sockets exceeds the thickness of the ring-sections of the rack in which they are formed, as shown in Fig. 4, and such sections are in consequence cut through at opposite sides to the depth of the sockets, thus forming a series of spaced slots 24 throughout the inner and the outer periphery of the rack through which the rollers project, as shown in Fig. 3. The rack in cross-section conforms approximately to the shape of the rollers and in the assembled bearing is supported by the same clear of the bushings, as shown in Fig. 1.

From the foregoing it will be seen that all sliding motion between the relatively moving parts is done away with and that a rolling contact only is possible under normal conditions. The greatest possible ease is thus obtained in turning with a minimum starting effort.

Having thus described my invention, I claim—

1. A roller-bearing comprising a series of double-cone rollers, a rack having sockets tapering in opposite directions in which the rollers are separately contained, and sectional bushings, the members of which combine to form a race for the rollers and are separated to clear the middle portions thereof.

2. A roller-bearing comprising a series of free, double-cone rollers, a rack having symmetrical double-conical sockets of greater diameter than the rack-section and in which the rollers are spaced, and bushings providing bearings for the rollers at opposite ends thereof.

3. A roller-bearing comprising a series of free, double-cone rollers, a rack conforming in cross-section to the shape of the rollers in which the rollers are separately contained in recesses having inner and outer openings narrower than the diameter of said rollers, and a sectional bushing providing bearings for the rollers at the ends thereof only.

4. A roller-bearing comprising a series of double-cone rollers, a sectional rack for the rollers, the members of which combine to form separate double-conical containing-pockets having inner and outer openings of less width than the diameter of the rollers, and a sectional bushing adapted to serve as a race therefor.

5. A roller-bearing comprising a series of double-cone rollers, a rack formed of twin sections having each a series of conical recesses which combine to provide separate double-conical containing-pockets for the rollers, and a sectional bushing adapted to serve as a race therefor.

6. A roller-bearing comprising a series of double-cone rollers, a two-part rack comprising counterpart sections, each part having tapering recesses which combine to provide separate containing-pockets in which the rollers are partly inclosed, and a sectional bushing adapted to serve as a race therefor.

In testimony whereof I affix my signature in the presence of two witnesses.

ARTHUR JACOB MORSE.

Witnesses:
W. H. PUMPHREY,
CHARLES D. GREEN.